US011323845B2

(12) United States Patent
Wootton et al.

(10) Patent No.: US 11,323,845 B2
(45) Date of Patent: *May 3, 2022

(54) REVERSE-BEACON INDOOR POSITIONING SYSTEM USING EXISTING DETECTION FIELDS

(71) Applicant: Ivani, LLC, Dardenne Prairie, MO (US)

(72) Inventors: Matthew Wootton, St. Louis, MO (US); Liani Lye, Gardena, CA (US); Kevin Zhang, Sugar Land, TX (US); Boris Dieseldorff, St. Charles, MO (US); John Wootton, St. Louis, MO (US)

(73) Assignee: Ivani, LLC, Dardenne Prairie, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,288

(22) Filed: Apr. 3, 2019

(65) Prior Publication Data
US 2019/0230470 A1 Jul. 25, 2019

Related U.S. Application Data

(63) Continuation of application No. 15/851,458, filed on Dec. 21, 2017, which is a continuation-in-part of
(Continued)

(51) Int. Cl.
*H04W 24/00* (2009.01)
*H04W 4/02* (2018.01)
(Continued)

(52) U.S. Cl.
CPC ........... *H04W 4/023* (2013.01); *G01S 5/0221* (2013.01); *G01V 3/12* (2013.01); *H04B 17/318* (2015.01);
(Continued)

(58) Field of Classification Search
CPC ...... G01S 5/0252; G01S 5/018; G01S 5/0244; G01S 5/0249; G01S 5/02525; G01S 5/0295; H04W 64/00
See application file for complete search history.

(56) References Cited

U.S. PATENT DOCUMENTS 4,054,879 A 10/1977 Wright et al.
4,649,388 A 3/1987 Atlas
(Continued)

FOREIGN PATENT DOCUMENTS

CA 2834522 A1 5/2014
CA 2945702 A1 8/2015
(Continued)

OTHER PUBLICATIONS

International Search Report, International Patent Application No. PCT/US2015/013127, dated Apr. 24, 2015 (10 pages).
(Continued)

*Primary Examiner* — Shantell L Heiber
(74) *Attorney, Agent, or Firm* — Lewis Rice LLC

(57) ABSTRACT

Indoor positioning systems and methods including a reverse-beacon for location determination and presence sensing technology. The reverse-beacon is any device comprising a transceiver and a computer operating with system nodes and will generally be in the form of a smartphone or other mobile computer. The systems and methods utilize wireless signals of any device that adheres to a general-purpose communication protocol, such as Bluetooth™ and Wi-Fi, to provide location-based services such as location determination and acting as a ground-truth field for presence sensing systems. The systems and methods operate by passively licensing to wireless communications that take place during the ordinarily course of operation of a wireless network irrespective of the presence of the reverse-beacon.

20 Claims, 3 Drawing Sheets

Related U.S. Application Data application No. 15/600,380, filed on May 19, 2017, now Pat. No. 10,064,013, which is a continuation of application No. 15/227,717, filed on Aug. 3, 2016, now Pat. No. 9,693,195, which is a continuation of application No. 15/084,002, filed on Mar. 29, 2016, now Pat. No. 9,474,042.

(60) Provisional application No. 62/437,412, filed on Dec. 21, 2016, provisional application No. 62/252,954, filed on Nov. 9, 2015, provisional application No. 62/219,457, filed on Sep. 16, 2015.

(51) Int. Cl.

| | | |
|---|---|---|
| *H04L 5/00* | (2006.01) | |
| *H04L 1/00* | (2006.01) | |
| *H04W 4/90* | (2018.01) | |
| *G01V 3/12* | (2006.01) | |
| *H04B 17/318* | (2015.01) | |
| *H04W 64/00* | (2009.01) | |
| *G01S 5/02* | (2010.01) | |
| *G01S 5/00* | (2006.01) | |
| *G01S 5/14* | (2006.01) | |
| *H04W 4/33* | (2018.01) | |

(52) U.S. Cl.
CPC ............ *H04L 1/0018* (2013.01); *H04L 5/006* (2013.01); *H04W 4/027* (2013.01); *H04W 4/90* (2018.02); *H04W 64/00* (2013.01); *G01S 5/0036* (2013.01); *G01S 5/14* (2013.01); *H04L 5/0058* (2013.01); *H04W 4/33* (2018.02)

(56) References Cited

U.S. PATENT DOCUMENTS

| | | |
|---|---|---|
| 4,740,045 A | 4/1988 | Goodson et al. |
| 5,270,720 A | 12/1993 | Stove |
| 5,563,455 A | 10/1996 | Cheng |
| 5,696,514 A | 12/1997 | Nathanson et al. |
| 6,075,797 A | 6/2000 | Thomas |
| 6,493,380 B1 | 12/2002 | Wu et al. |
| 6,539,483 B1 | 3/2003 | Harrison et al. |
| 6,573,861 B1 | 6/2003 | Hommel et al. |
| 6,693,536 B2 | 2/2004 | Bauer, Jr. et al. |
| 7,047,015 B2 | 5/2006 | Hawe |
| 7,295,109 B2 | 11/2007 | Kobayashi |
| 7,317,419 B2 | 1/2008 | Sugar et al. |
| 7,423,576 B2 | 9/2008 | Sahinoglu et al. |
| 7,652,617 B2 | 1/2010 | Kurtz et al. |
| 7,663,325 B2 | 2/2010 | McDonough et al. |
| 7,733,220 B2 | 6/2010 | Libby |
| 8,138,918 B2 | 3/2012 | Habib et al. |
| 8,274,386 B1 | 9/2012 | Dea et al. |
| 8,354,925 B1 | 1/2013 | Libby et al. |
| 8,402,543 B1 | 3/2013 | Ranjan et al. |
| 8,456,304 B2 | 6/2013 | van Doorn et al. |
| 8,502,666 B1 | 8/2013 | Tam et al. |
| 8,531,134 B2 | 9/2013 | Chemel et al. |
| 8,536,998 B1 | 9/2013 | Siu et al. |
| 8,552,664 B2 | 10/2013 | Chemel et al. |
| 8,555,388 B1 | 10/2013 | Wang et al. |
| 8,593,264 B2 | 11/2013 | Umezawa et al. |
| 8,624,734 B2 | 1/2014 | Inomata et al. |
| 8,682,812 B1 | 3/2014 | Ranjan |
| 8,762,298 B1 | 6/2014 | Ranjan et al. |
| 8,766,556 B2 | 7/2014 | Meyer |
| 8,793,790 B2 | 7/2014 | Khurana et al. |
| 8,818,288 B2 | 8/2014 | Patwari et al. |
| 8,836,344 B2 | 9/2014 | Habib et al. |
| 8,842,010 B2 | 9/2014 | Cehelnik |
| 8,844,038 B2 | 9/2014 | Niemela |
| 8,849,471 B2 | 9/2014 | Daniel et al. |
| 8,984,581 B2 | 3/2015 | Luna et al. |
| 9,143,413 B1 | 9/2015 | Manku et al. |
| 9,143,968 B1 | 9/2015 | Manku et al. |
| 9,144,041 B2 | 9/2015 | Curtis et al. |
| 9,185,121 B2 | 11/2015 | Chari et al. |
| 9,245,426 B2 | 1/2016 | Caicedo Fernandez et al. |
| 9,369,476 B2 | 6/2016 | Chekina et al. |
| 9,378,361 B1 | 6/2016 | Yen et al. |
| 9,407,663 B1 | 8/2016 | Pauley, Jr. et al. |
| 9,413,839 B2 | 8/2016 | Annan et al. |
| 9,473,901 B1 * | 10/2016 | White ................... H04W 4/023 |
| 9,474,042 B1 | 10/2016 | Wootton et al. |
| 9,507,008 B1 | 11/2016 | Thiagarajan |
| 9,523,760 B1 | 12/2016 | Kravets et al. |
| 9,524,628 B1 | 12/2016 | Omer et al. |
| 9,584,974 B1 | 2/2017 | Omer et al. |
| 9,693,195 B2 | 6/2017 | Wootton et al. |
| 9,743,294 B1 | 8/2017 | Omer et al. |
| 9,980,020 B1 | 5/2018 | Sharp et al. |
| 10,064,013 B2 | 8/2018 | Wootton et al. |
| 2003/0108119 A1 | 6/2003 | Mohebbi et al. |
| 2004/0080415 A1 | 4/2004 | Sorenson |
| 2004/0196140 A1 | 10/2004 | Sid |
| 2005/0055568 A1 | 3/2005 | Agrawala et al. |
| 2005/0083199 A1 | 4/2005 | Hall et al. |
| 2006/0037077 A1 | 2/2006 | Gadde et al. |
| 2006/0217132 A1 | 9/2006 | Drummond-Murray et al. |
| 2007/0133487 A1 * | 6/2007 | Wang ................... H04W 64/00 370/338 |
| 2007/0225000 A1 | 9/2007 | Cleveland |
| 2007/0283002 A1 | 12/2007 | Bornhoevd et al. |
| 2008/0062940 A1 | 3/2008 | Othmer et al. |
| 2008/0119130 A1 | 5/2008 | Sinha |
| 2008/0148398 A1 | 6/2008 | Mezack et al. |
| 2008/0214111 A1 * | 9/2008 | Moshir .................. H04M 1/66 455/41.2 |
| 2008/0240008 A1 | 10/2008 | Backes et al. |
| 2008/0303655 A1 | 12/2008 | Johnson |
| 2008/0318564 A1 | 12/2008 | Kreiner et al. |
| 2009/0040952 A1 | 2/2009 | Cover et al. |
| 2009/0062696 A1 | 3/2009 | Nathan et al. |
| 2009/0184804 A1 | 7/2009 | Seppa |
| 2009/0256483 A1 | 10/2009 | Gehman et al. |
| 2009/0284245 A1 | 11/2009 | Kirby et al. |
| 2010/0125897 A1 | 5/2010 | Jain et al. |
| 2010/0141437 A1 | 6/2010 | Karam et al. |
| 2010/0145545 A1 | 6/2010 | Mosebrook et al. |
| 2010/0265093 A1 * | 10/2010 | Cho ..................... G01S 5/0252 340/8.1 |
| 2010/0315284 A1 | 12/2010 | Trizna et al. |
| 2010/0328492 A1 | 12/2010 | Fedorovskaya et al. |
| 2011/0130092 A1 | 6/2011 | Yun |
| 2011/0141647 A1 | 6/2011 | Garcia et al. |
| 2011/0153811 A1 | 6/2011 | Jeong et al. |
| 2011/0211563 A1 | 9/2011 | Herrala et al. |
| 2011/0260871 A1 | 10/2011 | Karkowski |
| 2011/0309931 A1 | 12/2011 | Rose |
| 2012/0009882 A1 | 1/2012 | Patwari et al. |
| 2012/0046003 A1 | 2/2012 | Ying |
| 2012/0092060 A1 | 4/2012 | Ganesan |
| 2012/0115512 A1 | 5/2012 | Grainger et al. |
| 2012/0146788 A1 | 6/2012 | Wilson et al. |
| 2012/0181865 A1 | 7/2012 | Muthu |
| 2012/0184296 A1 | 7/2012 | Milosiu et al. |
| 2012/0207481 A1 | 8/2012 | Elberbaum |
| 2012/0207484 A1 | 8/2012 | Hunt |
| 2013/0067566 A1 | 3/2013 | Oh |
| 2013/0090151 A1 | 4/2013 | Ngai et al. |
| 2013/0162459 A1 | 6/2013 | Aharony et al. |
| 2013/0175863 A1 | 7/2013 | Pan |
| 2013/0260602 A1 | 10/2013 | German et al. |
| 2013/0283256 A1 | 10/2013 | Proud |
| 2014/0004874 A1 | 1/2014 | Schwartz et al. |
| 2014/0015706 A1 | 1/2014 | Ishihara et al. |
| 2014/0087752 A1 * | 3/2014 | Zhu ...................... G01S 5/0252 455/456.1 |
| 2014/0128778 A1 | 5/2014 | Chan et al. |
| 2014/0135042 A1 | 5/2014 | Buchheim et al. |
| 2014/0140231 A1 | 5/2014 | Haiut et al. |

(56) References Cited

U.S. PATENT DOCUMENTS

| | | | |
|---|---|---|---|
| 2014/0165207 A1 | 6/2014 | Engel et al. | |
| 2014/0247179 A1 | 9/2014 | Furuskog et al. | |
| 2014/0286380 A1 | 9/2014 | Prager et al. | |
| 2014/0292306 A1* | 10/2014 | Prance | G01V 3/088 324/123 R |
| 2014/0312128 A1 | 10/2014 | Matsuoka et al. | |
| 2014/0330960 A1 | 11/2014 | Haga et al. | |
| 2014/0331272 A1 | 11/2014 | Gupta et al. | |
| 2015/0005900 A1 | 1/2015 | Steele et al. | |
| 2015/0022123 A1 | 1/2015 | Van De Sluis et al. | |
| 2015/0043377 A1 | 2/2015 | Cholas et al. | |
| 2015/0059248 A1 | 3/2015 | Iwata et al. | |
| 2015/0069242 A1 | 3/2015 | Alameh et al. | |
| 2015/0078295 A1 | 3/2015 | Mandyam et al. | |
| 2015/0098377 A1 | 4/2015 | Amini et al. | |
| 2015/0141045 A1* | 5/2015 | Qiu | H04W 4/021 455/456.1 |
| 2015/0143454 A1 | 5/2015 | Lee et al. | |
| 2015/0181548 A1 | 6/2015 | Varoglu et al. | |
| 2015/0187192 A1 | 7/2015 | Tabe | |
| 2015/0195100 A1 | 7/2015 | Imes et al. | |
| 2015/0212205 A1 | 7/2015 | Shpater | |
| 2015/0230022 A1 | 8/2015 | Sakai et al. | |
| 2015/0245164 A1 | 8/2015 | Merrill | |
| 2015/0282081 A1 | 10/2015 | Oren | |
| 2015/0295808 A1 | 10/2015 | O'Malley et al. | |
| 2015/0301173 A1 | 10/2015 | Vangeel et al. | |
| 2015/0338507 A1 | 11/2015 | Oh et al. | |
| 2015/0344265 A1 | 12/2015 | Hakonen et al. | |
| 2015/0348007 A1 | 12/2015 | Khan et al. | |
| 2015/0349972 A1 | 12/2015 | Deivasigamani et al. | |
| 2016/0018508 A1 | 1/2016 | Chen et al. | |
| 2016/0021485 A1 | 1/2016 | Sallas et al. | |
| 2016/0028763 A1 | 1/2016 | Cruz Mota et al. | |
| 2016/0035196 A1 | 2/2016 | Chan | |
| 2016/0050182 A1 | 2/2016 | Edross | |
| 2016/0050224 A1 | 2/2016 | Ricafort et al. | |
| 2016/0100046 A1* | 4/2016 | Meru | H04M 1/72572 455/419 |
| 2016/0104365 A1 | 4/2016 | Henderson et al. | |
| 2016/0105278 A1 | 4/2016 | Huang | |
| 2016/0127875 A1 | 5/2016 | Zampini, II | |
| 2016/0131750 A1 | 5/2016 | Lu et al. | |
| 2016/0161339 A1 | 6/2016 | Tan | |
| 2016/0183059 A1 | 6/2016 | Nagy et al. | |
| 2016/0187475 A1 | 6/2016 | Horng et al. | |
| 2016/0189532 A1 | 6/2016 | Malhotra et al. | |
| 2016/0210838 A1 | 7/2016 | Yan et al. | |
| 2016/0234167 A1 | 8/2016 | Engel et al. | |
| 2016/0241999 A1 | 8/2016 | Chin et al. | |
| 2016/0261986 A1* | 9/2016 | Nord | H04W 4/33 |
| 2016/0301543 A1 | 10/2016 | Minezawa et al. | |
| 2016/0335861 A1 | 11/2016 | Shimura | |
| 2016/0371959 A1 | 12/2016 | Henderson et al. | |
| 2017/0024574 A1 | 1/2017 | Agrawal et al. | |
| 2017/0134182 A1 | 5/2017 | Davis et al. | |
| 2017/0146656 A1 | 5/2017 | Belsley et al. | |
| 2017/0257744 A1 | 9/2017 | Wootton et al. | |
| 2017/0343658 A1 | 11/2017 | Ramirez et al. | |
| 2017/0366938 A1 | 12/2017 | Wootton et al. | |
| 2018/0279251 A1* | 9/2018 | Wigren | H04W 24/10 |

FOREIGN PATENT DOCUMENTS

| | | |
|---|---|---|
| CN | 101013522 A | 8/2007 |
| CN | 101184353 A | 5/2008 |
| CN | 101346640 A | 1/2009 |
| CN | 101436336 A | 5/2009 |
| CN | 201319687 Y | 9/2009 |
| CN | 201467534 U | 5/2010 |
| CN | 201639825 U | 11/2010 |
| CN | 201839492 U | 5/2011 |
| CN | 102131327 A | 7/2011 |
| CN | 102331302 A | 1/2012 |
| CN | 202475882 U | 10/2012 |
| CN | 102883360 A | 1/2013 |
| CN | 202738203 U | 2/2013 |
| CN | 202759621 U | 2/2013 |
| CN | 203241317 U | 10/2013 |
| CN | 203243557 U | 10/2013 |
| CN | 203251317 U | 10/2013 |
| CN | 103458413 A | 12/2013 |
| CN | 103596266 A | 2/2014 |
| CN | 104502982 A | 4/2015 |
| CN | 104835277 A | 8/2015 |
| EP | 1829003 B1 | 11/2013 |
| JP | H01162186 A | 6/1989 |
| JP | 2005136532 A | 5/2005 |
| JP | 2005535950 A | 11/2005 |
| JP | 2006129098 A | 5/2006 |
| JP | 2007159370 A | 6/2007 |
| JP | 2008305800 A | 12/2008 |
| JP | 2009229318 A | 10/2009 |
| JP | 2011109784 A | 6/2011 |
| JP | 2012190161 A | 10/2012 |
| JP | 201552475 A | 3/2015 |
| JP | 2015052475 A | 3/2015 |
| JP | 2015098679 A | 5/2015 |
| JP | 2015527573 A | 9/2015 |
| JP | 2015222173 A | 12/2015 |
| JP | 2016206851 A | 12/2016 |
| KR | 100887425 B1 | 3/2009 |
| KR | 100912039 B1 | 8/2009 |
| KR | 20090113941 A | 11/2009 |
| KR | 101009613 B1 | 1/2011 |
| KR | 20130012996 A | 2/2013 |
| KR | 20130017298 A | 2/2013 |
| KR | 20140025207 A | 3/2014 |
| KR | 20140080755 A | 7/2014 |
| KR | 20140120748 A | 10/2014 |
| RS | 20130027 A1 | 6/2014 |
| WO | 2011062445 A2 | 5/2011 |
| WO | 2012004420 A1 | 1/2012 |
| WO | 2012010170 A1 | 1/2012 |
| WO | 2014021574 A1 | 2/2014 |
| WO | 2014026226 A1 | 2/2014 |
| WO | 2014109486 A1 | 7/2014 |
| WO | 2014201574 A1 | 12/2014 |
| WO | 2015035830 A1 | 3/2015 |
| WO | 2015168700 A1 | 11/2015 |
| WO | 2016160376 A1 | 10/2016 |
| WO | 2017078811 A2 | 5/2017 |

OTHER PUBLICATIONS

International Search Report, International Patent Application No. PCT/US2015/058019, dated Feb. 5, 2016 (10 pages).

International Search Report, International Patent Application No. PCT/US2015/057869, dated Feb. 5, 2016 (10 pages).

International Search Report, International Patent Application No. PCT/US2016/016836, dated May 24, 2016 (12 pages).

International Search Report, International Patent Application No. PCT/US2016/045611, dated May 16, 2017, (10 pages).

Adib, Fadel et al., "See Through Walls with Wi-Fi!", ACM SIGCOMM Computer Communication Review, Oct. 2013, vol. 43, Issue 4, pp. 75-86 (12 pages).

Extended European Search Report, European Patent Application No. EP 17 88 3236.6, dated May 15, 2020 (9 pages).

European Search Report issued for Application No. EP20166495.0, dated Sep. 8, 2020, 5 pages.

International Search Report and Written Opinion issued for PCT/IB2020/000143, dated Jul. 22, 2020, 10 pages.

European Search Report and Written Opinion for Application No. PCT/19US/014197, dated Sep. 1, 2021, 8 pages.

International Search Report, International Patent Application No. PCT/US2017/067972, dated Feb. 27, 2018 (13 pages).

International Search Report, International Patent Application No. PCT/US2018/047555, dated Nov. 13, 2018 (10 pages).

International Search Report, International Patent Application No. PCT/US2018/045835, dated Nov. 20, 2018 (21 pages).

(56) References Cited

OTHER PUBLICATIONS

Youssef, Moustafa, et al., "Challenges: Device-free Passive Localization for Wireless Environments", Mobicom 2007 Proceedings of the 13th Annual ACM International Conference on Mobile Computing and Networking, held on Sep. 9-14, 2007, in Montreal, Quebec, Canada, pp. 222-229 (8 pages).

NETGEAR®, "N600 WiFi Cable Modem Router, Model C3700 User Manual", dated Mar. 2014 (101 pages).

OPENWRT,"Wireless Configuration", https://web.archive.org/web/20140402033233/http://wiki.openwrt.org/doc/uci/wireless (capture of URL http://wiki.openwrt.org/doc/uci/wireless on Apr. 2, 2014), printed on Jan. 25, 2018 (10 pages).

Japan Radio Co., Ltd; "26GHz FWA—Technology"; http://www.jrc.co.jp/eng/product/lineup/26ghz_wireless_ip_access_system/tech.html, printed on Jan. 25, 2018 (3 pages).

Apple Insider; "Intel to reportedly supply LTE chips for 2016 iPhone"; http://appleinsider.com/articles/15/03/11/intel-to-reportedly-supply-lte-chips-for-2016-iphone, published Nov. 3, 2015, printed on Jan. 25, 2018 (9 pages).

CEVA; "CEVA's DSP Cores Power the World's Leading Mobile Broadband and M2M Applications"; http://www.ceva-dsp.com/Mobile-Broadband; May 15, 2016, printed on Jan. 25, 2018 (3 pages).

quora.com; "What is the function of the baseband processor in wireless devices?"; https://www.quora.com/What-is-the-function-of-the-baseband-processor-in-wireless-devices; May 15, 2016, printed on Jan. 25, 2018 (2 pages).

Wikipedia; "Baseband processor", rhttps://en.wikipedia.org/wiki/Bandband_processor; 2 pages; version dated Apr. 19, 2016, printed on Jan. 25, 2018 (1 page).

China National Intellectual Property Administration, First Office Action and Search Report, dated Dec. 30, 2021, 8 pages.

Intellectual Property India, The Patent Office, Examination Report, dated Mar. 18, 2022, 7 pages.

\* cited by examiner

REVERSE-BEACON INDOOR POSITIONING SYSTEM USING EXISTING DETECTION FIELDS

CROSS-REFERENCE TO RELATED APPLICATIONS

This application is a Continuation of U.S. Utility patent application Ser. No. 15/851,458, filed Dec. 21, 2017. U.S. Utility patent application Ser. No. 15/851,458 claims benefit of U.S. Provisional Patent Application Ser. No. 62/437,412, filed Dec. 21, 2016, and is a Continuation-in-Part of U.S. Utility patent application Ser. No. 15/600,380, filed May 19, 2017. U.S. Utility patent application Ser. No. 15/600,380 is a Continuation of U.S. Utility patent application Ser. No. 15/227,717, filed Aug. 3, 2016, which is a Continuation of U.S. Utility patent application Ser. No. 15/084,002, filed Mar. 29, 2016. U.S. Utility patent application Ser. No. 15/084,002 claims benefit of U.S. Provisional Patent Application Ser. No. 62/252,954, filed Nov. 9, 2015 and U.S. Provisional Patent Application No. 62/219,457, filed Sep. 16, 2015. The entire disclosure of all the above documents is herein incorporated by reference.

BACKGROUND OF THE INVENTION

Field of the Invention

This disclosure pertains to the field of location-based services.

Description of the Related Art

Wireless communication devices comprise one or more nodes which receive and transmit signals according to their programming. Such nodes may transmit information to a computer server through traditional communication means and any wireless technology or protocol. Most relevant to the disclosure herein are wireless communications, traditionally complying to some form of communication standard, including but not limited to Wi-Fi and Bluetooth™. Two types of such wireless communication information are becoming of high interest: those that aid in location determination and presence sensing.

Wireless communication technologies are gaining popularity in the commercial market. There is a plethora of existing technologies that address location determination of fixed assets, such as helping a person find car keys or tracking said person inside a building. But in order to function, these existing technologies all have numerous requirements that must be fulfilled. Existing technologies commonly comprise a system consisting of a number of specialized nodes. Each node is a special transceiver that is associated with the object of interest (e.g., the person, car keys, or mobile device), and the other nodes that may also act as transceivers being fixed assets of known location to the system. The nodes serve as "beacons," and the special transceiver takes signals from the fixed nodes, and passes said signals to a computing element to process said signals into a more usable form. Said processed information may then be displayed through a computer or utilized in another system including but not limited to location determination.

Signals from nodes are traditionally sent through a network consisting of Wi-Fi or Bluetooth™ based communication elements, where the information would be relayed to a computer server typically using a Wi-Fi router or a smart phone of some kind. Existing technologies typically utilize such signals to estimate distance to each transceiver and utilize said distance estimates from each transceiver through some means of triangulation to estimate the location of the device being tracked.

In both commercial and residential establishments, indoor positioning systems are constantly developed to become more efficient and cost effective. These services are starting to perform duties including but not limited to location determination, location tracking, geo-fencing, security, and navigation. Many of the services are also generally augmented by third-party devices used as ground truth and references. Previous systems require modifying existing hardware, whether it be through obtaining new circuitry, hardware, or programming or using an add-on or extension to change existing circuitry, hardware, or programming. To be valuable to the user, such location-sensing systems typically must have beacons fixed at known locations in the system to provide the triangulation relative to known points, as otherwise the triangulation or similar algorithms may be able to locate the special node relative the detecting nodes, but cannot place any nodes in a location relative to a fixed coordinate system.

To function properly, current indoor positioning systems essentially require large quantities of specialized "beacons" which are effectively the fixed nodes to be installed at each facility. The installation and establishment process of such beacons at every individual facility is both a costly and exhaustive process. These beacons then act as the fixed triangulation points to locate the special node whose location is of interest. As should be apparent, as triangulation algorithms require the knowledge of two beacons interacting with the special node, it is necessary in existing indoor detection systems to make sure that every point in the region of interest for detection is capable of communicating with two beacons.

Developed positioning system products in the commercial and industrial sectors rarely penetrate the home technology sector. The cost-sensitive consumer shows especially cognizant concerns regarding location-based services. The lack of established adoption of indoor positioning systems is often driven by a couple of main concerns, mainly in the realms of cost and convenience. Simply, it is expensive and cumbersome to install enough beacons in a residence to make the system operate properly while still being cost-effective.

The first problem is the high cost of purchasing the quantity of beacons and the software required for substantially all indoor positioning systems. Research shows that virtually no current system may currently operate without beacons. The idea of a beaconless system has been presented, but no one has actually implemented such a system because such a system fails on the triangulation algorithms. Given the expense of individual beacons and the quantity required for operation of the system, typically cost-sensitive consumers are hesitant to adopt such a system. A second problem is convenience in terms of the installed base. Substantially all indoor positioning systems include stationary beacons affixed to various locations in said system. Due to the specificity of particularly designed beacons to be communicating a specific signal for a receiver, such a system may not be easily replaced and the original setup must be completely translocated. By example and not limitation, if a household were to move, they would be forced to remove all the beacons in every room of the house, travel to the new residence, and then re-establish a brand new environment and system. This is extremely time-consuming and forces the onus of system maintenance and translocation on the consumer. Further, they may not have the right number or type of beacons for the new location, and therefore also have to invest in further infrastructure to make the system viable in the new location.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a reverse-beacon system designed to estimate its position relative to a set of nodes which create a detection field. Generally speaking, a reverse-beacon analyzes one or more sets of signals generated by one or more wireless devices in a detection field, analyzes patterns in those signals over time, and estimates its location relative to those nodes. Communications are not necessarily established directly between the reverse-beacon and the nodes in a detection field (e.g., protocol-based communications in which the reverse-beacon participates in the transfer of application data on the network), but the signals from nodes in a detection field can still be utilized for relative location within an environment. The ability to use trends and not require protocol-based communication with the nodes in the detection field allow a wide range of different devices on different protocols to be used by the reverse-beacon to estimate its location relative to those nodes.

In principle, such a system may operate by storing the locations of nodes in a detection field in a third-party service accessible to the reverse-beacon, the reverse-beacon then analyzing the identifiers provided by each of the devices from which it can detect communications, and locating itself relative to those devices within the context of the third party service. Without the requirement of direct protocol-based communications with the nodes in the detection field, the reverse-beacon can utilize existing infrastructure to estimate its position, and does not need access to the network provided by nodes in the detection field so long as the physical radios within the reverse-beacon can monitor the communications ongoing within that network.

Also described herein, among other things, is a method for locating a reverse-beacon in a detection field comprising: providing a reverse-beacon comprising a transceiver; a computer; providing a plurality of system nodes deployed to form a detection field; moving the reverse-beacon into the detection field; receiving first system node signals from a first system node in the plurality of system nodes at the transceiver; receiving second system node signals from a second system node in the plurality of system nodes at the transceiver; receiving third system node signals from a third system node in the plurality of system nodes at the transceiver; converting at the computer the first system node signals, the second system node signals, and the third system node signals to a historical dataset comprising: a first system node identifier and a first system node distance metric associated with the first system node; and a second system node identifier and a second system node distance metric associated with the second system node; a third system node identifier and a third system node distance metric associated with the third system node; repeating the receiving first system node signals step, the receiving second system node signals step, the receiving third system node signals steps, and the converting steps a plurality of times to form a plurality of the historical datasets; determining at the computer a location of the reverse-beacon relative to the first system node, the second system node, and the third system node, based upon comparing each of the historical datasets in the plurality of historical datasets to calculate a location of the reverse-beacon in the detection field.

In an embodiment of the method, the reverse-beacon comprises a mobile device.

In another embodiment of the method, the reverse-beacon comprises a smart phone or tablet computer.

In another embodiment of the method, the reverse-beacon comprises a wearable computer device.

In another embodiment of the method, the first system node is selected from the group consisting of: a computer; a network device; and a smart appliance.

In another embodiment of the method, the method further comprises determining at the computer a location determination status of the reverse-beacon with respect to the detection field.

In another embodiment of the method, the location determination status is selected from the group consisting of: approaching; departing; in room; static; and mobile.

In another embodiment of the method, the computer comprises a local network computer.

In another embodiment of the method, the reverse-beacon includes the local network computer.

In another embodiment of the method, the computer comprises a wireless computer server communicably coupled to the transceiver over a telecommunications network.

In another embodiment of the method, the method further comprises: providing a third party system; operating the third party system based at least in part on the location of the reverse-beacon determined in the determining step.

In another embodiment of the method, the third party system is selected from the group consisting of: an electrical system; a lighting system; a heating, venting, and cooling (HVAC) system; a security system; a home automation system; an industrial automation system.

In another embodiment of the method, the detection field is formed by wireless communications using a protocol selected from the group consisting of: Bluetooth™, Bluetooth™ Low Energy, ANT, ANT+, WiFi, Zigbee, Thread, and Z-Wave.

In another embodiment of the method, at least one the system node in the plurality of system nodes is configured to communicate using a different communication protocol than at least one other system node in the plurality of system nodes.

In another embodiment of the method, the detection field is disposed within an indoor space and the determining step further comprises determining at the computer a location of the reverse-beacon relative to the first system node, the second system node, and the third system node, based upon comparing each of the historical datasets in the plurality of historical datasets to triangulate a location of the reverse-beacon in the detection field.

In another embodiment of the method, the method is performed by the reverse-beacon only passively receiving wireless communication signals from the plurality of system nodes.

In another embodiment of the method, the method is performed by the reverse-beacon actively receiving wireless communication signals from the plurality of system nodes.

Also described herein, among other things, is a system for locating a reverse-beacon in a detection field comprising: a computer; a plurality of system nodes deployed to form a detection field; a reverse-beacon comprising a transceiver, a computer, and a non-volatile computer-readable storage medium having program instructions thereon which, when executed by the computer, cause the reverse-beacon to perform the steps of: receiving first system node signals from a first system node in the plurality of system nodes at the transceiver; receiving second system node signals from a second system node in the plurality of system nodes at the transceiver; receiving third system node signals from a third system node in the plurality of system nodes at the transceiver; converting at the first system node signals, the second system node signals, and the third system node signals to a historical dataset comprising: a first system node identifier and a first system node distance metric associated with the first system node; and a second system node identifier and a second system node distance metric associated with the second system node; a third system node identifier and a third system node distance metric associated with the third system node; repeating the receiving first system node signals step, the receiving second system node signals step, the receiving third system node signals steps, and the converting steps a plurality of times to form a plurality of the historical datasets; determining a location of the reverse-beacon relative to the first system node, the second system node, and the third system node, based upon comparing each of the historical datasets in the plurality of historical datasets to calculate a location of the reverse-beacon in the detection field.

In an embodiment of, the system further comprises: a third-party system; a computer server; wherein the program instructions thereon which, when executed by the computer, further cause the reverse-beacon to perform the steps of: transmitting the determined location of the reverse-beacon to the computer server; wherein the computer server comprises a non-volatile computer-readable medium having program instructions thereon which, when executed by the computer server, cause the computer server to operate the third party system based at least in part on the determined location of the reverse-beacon.

In another embodiment of the system, the third party system is selected from the group consisting of: an electrical system; a lighting system; a heating, venting, and cooling (HVAC) system; a security system; a home automation system; an industrial automation system.

DESCRIPTION OF THE PREFERRED EMBODIMENT(S)

Figure 1A:
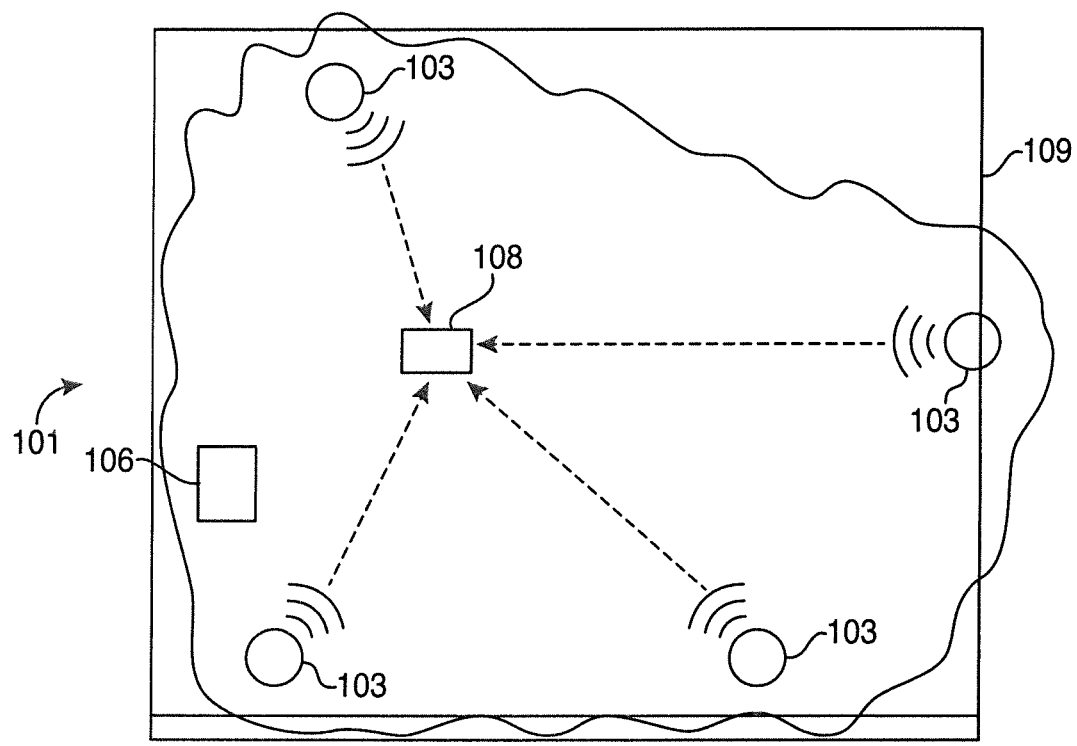
FIG. 1(a) provides a general block diagram of an embodiment of a reverse-beacon in a detection field.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

The systems and methods described herein provide an indoor positioning system in the form of a reverse-beacon which may be used for location determination and presence sensing technology. As used herein, a "reverse-beacon" is any device comprising a transceiver and a computer operating with system nodes and will generally be in the form of a smartphone or other mobile computer. The systems and methods described herein utilize wireless signals of any device that adheres to a communication protocol, including but not limited to Bluetooth™ and Wi-Fi, to provide for location-based services such as location determination and acting as a ground-truth field for presence sensing systems by placing technology within a single receiver node and listening to any pre-existing wireless communications systems already present in the given environment.

Distinct from traditional location tracking systems that rely upon networks formed from equipment specifically designed for location determination, the systems and methods of the present disclosure monitor wireless communications within a detection field formed from the nodes of any generic and pre-existing wireless communication networks, generally through some external configuration system. The reverse-beacon comprises a transceiver and computer, while the detection field comprises preferably at least three existing wireless communications devices of virtually any type. The existing wireless communication devices form a detection field that transmits signals that the reverse-beacon receives. The reverse-beacon processes wireless signals to create usable location information from the existing nodes around it. The information may then be used in a variety of ways, including but not limited to display on a computer or as additional information for external systems such as presence sensing. This type of system is generally more cost-efficient, adaptable, and convenient than existing technologies because it utilizes pre-existing wireless communication devices where such devices need not be part of a self-contained communication network, nor must said pre-existing devices necessarily utilize the same communication protocols.

The systems and methods described herein provide an indoor positioning system in the form of a reverse-beacon which may be used for location determination and presence sensing technology. Distinct from traditional location tracking systems, which use pre-setup and dedicated location determination equipment in the environment to form the network for detecting, the present systems and methods may form a detection field from and subsequently operate within any set of nodes acting as existing wireless communication devices, whether or not said devices are on the same network and operate as beacons in a traditional sense.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wrist-wear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or balanced, as where each machine is capable of performing most or all functions of any other machine and is assigned tasks based on its available resources at a point in time. Thus, the term "computer," as used herein, may refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software may be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth™ and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, the term "network" generally refers to a voice, data, or other wireless communication network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "transceiver" refers to equipment, or a set of equipment, having the hardware, circuitry, and/or software to generate and transmit electromagnetic waves carrying messages, signals, data, or other information. A transceiver may also comprise the componentry to receive electric signals containing such messages, signals, data, or other information, and convert them to such electromagnetic waves. The term "receiver" refers to equipment, or a set of equipment, having the hardware, circuitry, and/or software to receive such transmitted electromagnetic waves and convert them into signals, usually electrical, from which the message, signal, data, or other information may be extracted. The term "transceiver" generally refers to a device or system that comprises both a transceiver and receiver, such as, but not necessarily limited to, a two-way radio, or wireless networking router or access point. For purposes of this disclosure, all three terms should be understood as interchangeable unless otherwise indicated; for example, the term "transceiver" should be understood to imply the presence of a receiver, and the term "receiver" should be understood to imply the presence of a transceiver.

Throughout this disclosure, the term "node" refers to a start or end point for a network communication, generally a device having a wireless transceiver and being a part of a communication network. Nodes are generally standalone, self-contained networking devices, such as wireless routers, wireless access points, short-range beacons, and so forth. A node may be a general-purpose device or a special-purpose device configured for use in a detection network as described herein. By way of example and not limitation, a node may be a device that has the wireless transmission capabilities of an off-the-shelf wireless networking device with a unique identification and a fixed known location. Within a network, each node may act as both a transceiver and receiver of network signals. This disclosure will typically refer to nodes as "system nodes," which are intended to be nodes that exist in a fixed location with a known identity that generally will not require any additional specialized hardware, circuitry, componentry, or programming for implementing the systems and methods described herein and also might not necessarily be communicating on the same wireless communication network as other system nodes in the same system. For clarity, reverse-beacon node is different from the ""system nodes"" in that it requires some combination of specialized hardware, circuitry, componentry, or programming for implementing the systems and methods described herein. Generally, at least three system nodes, which need not be part of the same wireless communication network, will be used by the reverse-beacon to determine its location.

Throughout this disclosure, the term "detection field" refers to a space that is being utilized for location based services. Generally, this field will be populated by various nodes that may broadcast signals to be received by a reverse-beacon. Detection fields are preferably standalone, self-contained locations, such as a room or a house. Detection fields may be general-purpose or specialized, including but not limited to functions such as location tracking, presence sensing, geo-fencing, and security. By way of example and not limitation, a detection field may be a room containing a computational device such as a computer, a speaker set, and a coffeemaker that all broadcast Bluetooth™ 2.4 GHz and which may be connected to by a reverse-beacon in the form of a wearable. Connections between such devices in a detection field and the reverse-beacon need not be fully established insomuch as the data transferred between the devices in the detection field need not be decrypted by the reverse-beacon, but rather that the transceiver(s) within the reverse-beacon can detect the existence of network traffic and identify the origin of that traffic. Detection fields may be all encompassing and whole, such as a single field for any entire building, or they may be fragmented and individualized, such as one sub-field for each room, but collectively identifiable as one field. The main parameter of the detection field is that of a physical space that comprises system nodes for location based services as discussed in this disclosure.

Substantially all current systems are limited because they require large quantities of specially designed beacons, often numbering in the tens and twenties. The present systems and methods do not require many (if any at all) specialized beacons because they use signals from every day, off-the-shelf devices that pre-exist in a facility. For example, existing wireless routers, hot-spots, and any other device which communicates wirelessly may be used as a "system node" in the reverse-beacon systems and methods discussed herein. This makes the present systems much more affordable and provides greater ease-of-installation than substantially all current systems, as much of the infrastructure is already present in many facilities. By way of example and not limitation, a reverse-beacon system may be setup by logging media access control (MAC) address locations at least one time, and storing them via a third-party service such that said MAC address and associated location may be retrieved and utilized by other reverse-beacon devices.

System nodes in the present systems and methods are simply wireless communication devices that may self-identify and maintain a known location relative to a fixed coordinate system (e.g., not relative to each other) or which may report their position in the same fixed coordinate system. From each system node, the reverse-beacon receives one or more of the following: signal strength, bit error rate, latency, or other signal properties. A computer, which may be at the reverse-beacon or elsewhere, then processes the signal into usable information; specifically, it can determine a distance, angle, or other variable related to the reverse-beacon's position relative to the system node. Said information may then be utilized by the reverse-beacon, or transmitted to a local computer or an external computer server for display or utilization in another system. The number of nodes does not rely upon household size, the number of rooms, or the number of transceivers a user desires to track or locate. Cost-sensitive consumers would be much more inclined towards a singular purchase than numerous purchases for a system that requires an exhaustive installation.

Essentially, the systems and methods discussed herein allow for detection by eliminating the need for the fixed beacons that are specialized to handle the processing of algorithms in location determination. Instead, the nodes in the present system simply behave as normal. They communicate with each other or other systems in the network wirelessly as they are designed to do. As they do so, the reverse-beacon is able to determine the relative location of the nodes with respect to itself from the interference, signal strength, or other defining factors. This relative location can then be provided to a processor which knows the locations of the nodes in real space and from that the location of the reverse-beacon in real space can be determined.

The present systems can also provide improved convenience. System installation involves simply placing wireless communication devices, such as a desktop or a wireless speaker set, in user-configured locations within an environment. In certain embodiments, such location information may be made available via a third-party service. There is no need to purposefully position wireless communication devices in fixed locations, as it is generally presumed that the average user will have a relatively large number of wireless nodes in the room. Further, it does not matter if a particular node is not useful in position detection, as its purpose is primarily to provide wireless services outside of the position detection. The position detection is secondary. Thus, a wireless speaker and adapter on a stereo system both act as nodes in the present system. However, each has the primary purpose to transmit sound signals wirelessly to the speakers for reproduction; the detection is secondary.

The reverse-beacon may be a single piece of hardware that will generally be in the form of a wearable or mobile device, and requires less hardware to be additionally obtained and installed than the traditional beacon setups. However, it will also generally be a device associated with the object to be tracked or detected. In many cases, as the object of interest is a person that would be carrying a smart phone on their person or wearing a wearable, the connection is generally immediately apparent. Thus, existing wireless communication systems can be utilized for location referencing which requires little to no additional effort. Furthermore, the systems and methods of the present disclosure are adaptable because they may be augmented with and receive signals from newly added system nodes, regardless of communication protocol.

Because node data need only compared to itself (that is, each node preferably only knows how to determine the necessary variables for triangulation only from itself), differing magnitudes of signal from different nodes resulting from varying protocols, devices, etc. do not affect reverse-beacon outputs. Each node instead determines the specific variable between itself and the reverse-beacon (for instance, distance) by any means. The node then provides this common variable (distance, in this example) to a central controller that can locate the reverse-beacon from those variables. This means that detection fields may comprise virtually any hybrid of various system nodes, using different communication methods such as Wi-Fi and Bluetooth™ within the reverse-beacon system. "Distance" as used above may be an absolute distance between devices, or a relative distance indication wherein a collection of "distances" from nodes in a detection field may be analyzed to estimate the position of the reverse-beacon relative and/or absolute terms. A "distance metric" includes, but is not necessarily limited to, indications of signal strength, calculations estimating distance, and calculations estimating the change in distance between the reverse-beacon and a given node in a detection field. A "calculated location" may be either an absolute or relative location of the reverse-beacon in a detection field wherein the reverse-beacon calculates its position based on knowledge of distance metrics to the nodes in said detection field.

By example and not by way of limitation, if a new communication protocol were to be invented, the systems and methods discussed herein would still remain relevant and functional given that a system node following the new communication protocol may self-identify and maintain a new location to the reverse-beacon, which can still interact with the remaining nodes in the system in the same manner it has previously. These systems and methods may thus be easily installed and be easily adapted to new locations or system nodes regardless of changes occurring in underlying communication technologies or protocols. It should be recognized that in a still further embodiment, existing beacons could also interact with the reverse-beacon to provide still further variables and data points to improve accuracy.

Figure 4:
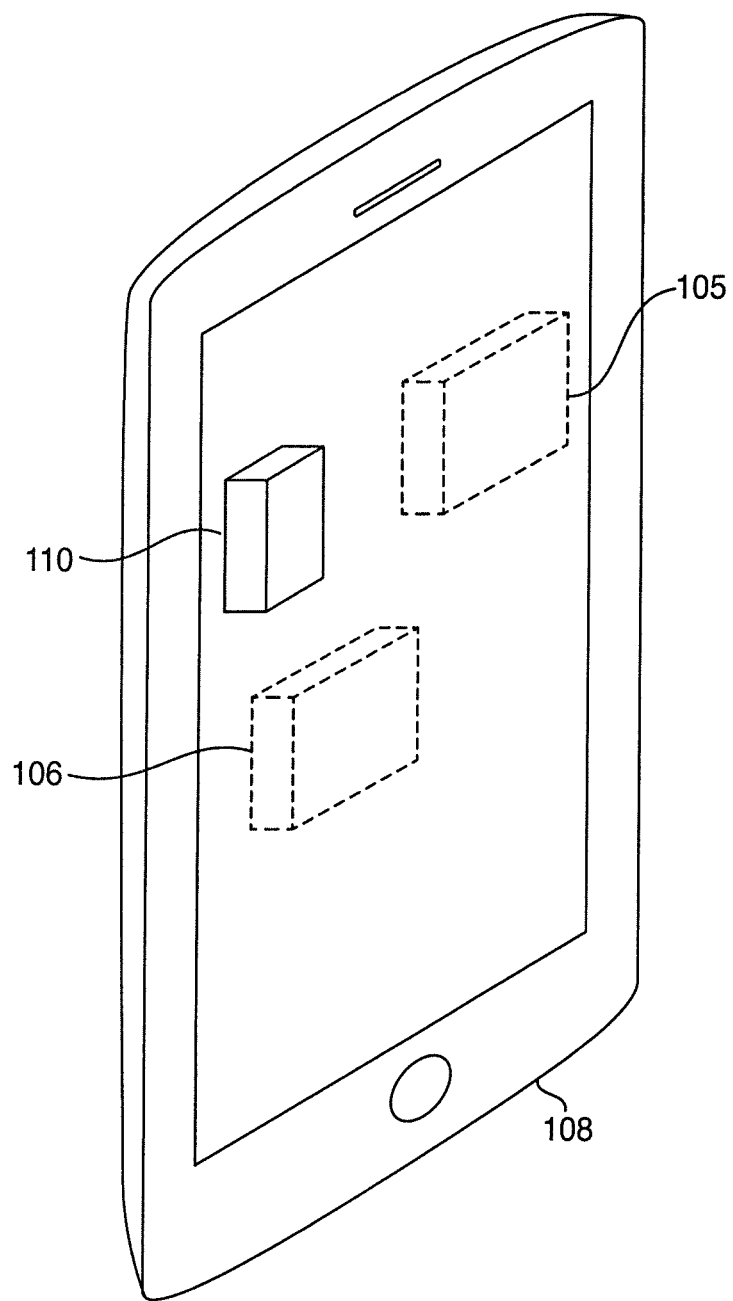
FIG. 4 provides a general block diagram of a smartphone which can be used as a reverse-beacon.

The following embodiments may be built around a physical device 108, hereby referred to as the reverse-beacon 108, that comprises a transceiver 105 and a computer 106 such as, without limitation, depicted in FIG. 4. The reverse-beacon 108 may have the transceiver 105 and computer 106 combined in one physical entity or separated. The transceiver 105 communicably coupled with a computer 106 provides for system nodes 103 within the detection fields 109. The transceiver 105 receives signals from the system nodes 103 that comprise the detection field 109. For the reverse-beacon 108 to operate, the detection field 109 must comprise at least three system nodes 103 which transmit signals to be received by the transceiver 105 of the reverse-beacon 108.

Figure 1B:
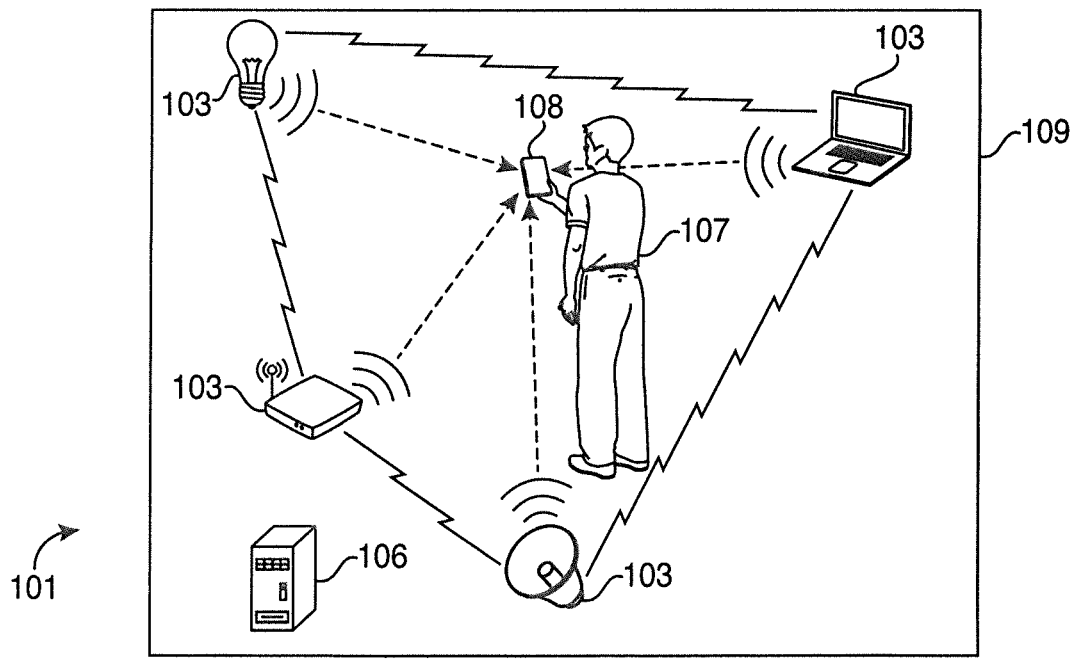
FIG. 1(b) illustrates an embodiment of a positioning system with the general blocks of FIG. 1(a) replaced with embodiments of the various elements.

The system nodes 103 may each follow different communication protocols, including but not limited to: Bluetooth™, Wi-Fi, or other known now or later discovered. Because of this, and because the system nodes 103 are typically fixed, the user is granted extreme flexibility in what constitutes a detection field 109 as shown in FIGS. 1a and 1b. In contrast, other systems require the user to install dedicated devices (beacons), an unappealing option for the cost-sensitive consumer.

In FIG. 1a there is provided an abstraction of the reverse-beacon 108 in the detection field 109 which in FIG. 1b is expanded by way of example and not by way of limitation, to show specific instances of system nodes 103.

The transceiver 105 converts the signals into data that the computer element 106 processes. Each data packet will generally include at least a system node identifier and the strength of the system node 103 broadcast signal at that time.

Figure 2:
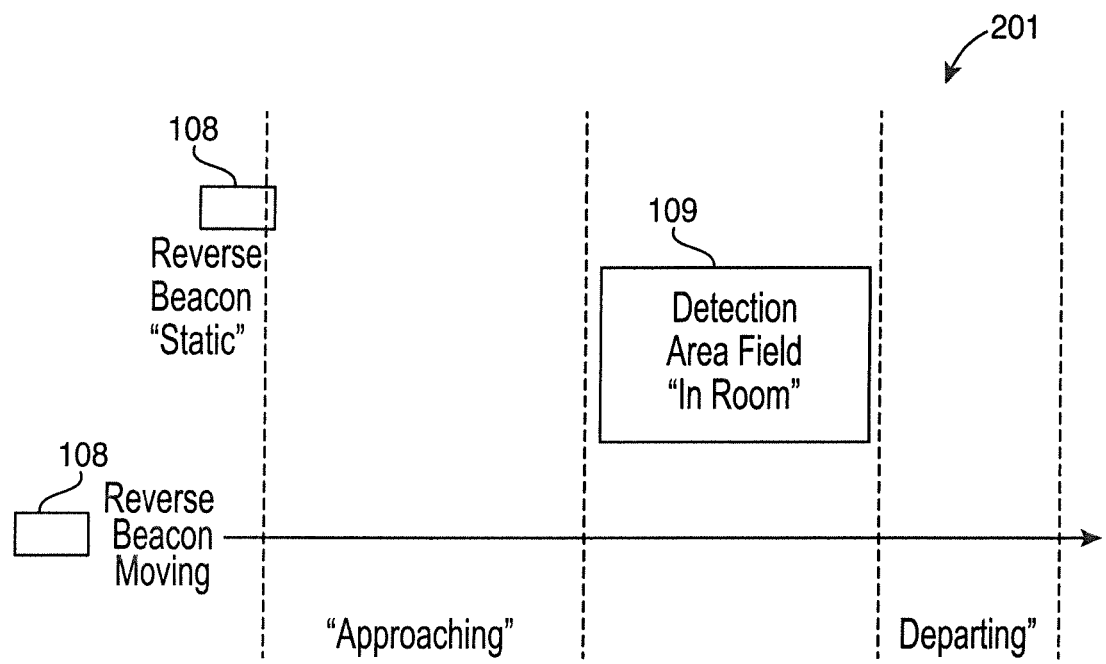
FIG. 2 provides an illustration of how location determinations can be made based on movement in relation to a detection area.

The computer 106 receives and processes the data, returning one of five possible location determinations of the reverse-beacon 108 in relation to the target room 109. The five possibilities are: approaching, departing, in room, static, and mobile, as shown in FIG. 2. To determine presence, prior systems comprising standardized beacons make decisions on the most recent data available from the perspective of magnitude. In contrast, the present systems and methods make decisions by comparing historical data on a per-node basis from the perspective of directional motion and/or distance estimates, thus making it independent of magnitude. In this fashion, these systems and methods may be used for system nodes 103 with a variety of communication protocols. Barring ensuring the data packets conform to standard communication protocols, this also eliminates the need for additional configuration, equipment, or calibration, all of which incur additional time and monetary cost.

Figure 3:
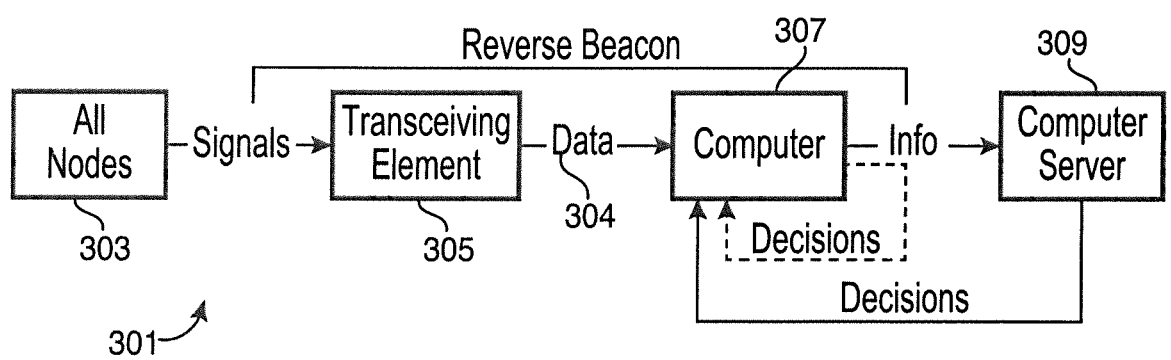
FIG. 3 provides a flowchart of an embodiment of a method for positioning which starts at signal transmission from the nodes and ending with an information display or utilization by a remote server or computer.

FIG. 2 provides an illustration of an algorithm embodiment 201 of location determinations based on movement in relation to detection field. FIG. 3 provides an illustration of a method 301 for location, starting at signal transmission from the nodes 103 and ending with information display or utilization by another server or computer.

To determine the outputs for location determination an embodiment utilizes a flow such as that shown in FIG. 3. First, a transceiver 105 receiving 303 one or more signals from each of the three or more system nodes 103; second, said transceiver converts 305 said signals into data about said signals; third, said data is passed 304 from said transceiver 105 to a computer 106; fourth, the computer 106 runs the data through some analysis process to determine the relative location of the reverse-beacon to the set of system nodes; wherein the system nodes need not be modified specifically for use with the reverse-beacon.

The computer 106 that determines the actual location or other real space value of the reverse-beacon 108 may either be a local network computer or a wireless computer server 106. The local network computer 106 may either be physically attached or separate from the transceiver 105. The local network computer 106 output may be displayed to users, providing them information for decision-making. The local network computer 106 output may also be used to inform the actions of local mechanisms, including but not limited to smart lights, heating systems, or cooling systems. The wireless computer server 106 may utilize the information for remote or network-based mechanisms, including but not limited to a system that may operates on cloud computing. Each system node 103 signal strength is preferably given by its RSSI (received signal strength indicator).

In an embodiment of the reverse-beacon 108, a transceiver 105 may be attached to a computer 106, in which the transceiver 105 may receive signals and process said signals into data, and the computer 106 processes the data into usable information. The computer 106 may utilize wireless communications to coordinate with other systems inside the household, including but not limited to lighting systems, or it may be limited to display the information directly for the user. Said communication method is preferred to be Bluetooth™ Low Energy 2.4 GHz; however, that is not required. Any available wireless communication protocol may be used.

In an embodiment of the reverse-beacon 108, the reverse-beacon 108 comprises a wearable which comprises a transceiver 105 and computer 106, in which received signals may be processed into usable information all within the same reverse-beacon device 108. The information may be displayed visually to the user via a small monitor. The wearable may also interface with other communication protocols to communicate with other systems inside the household, including but not limited to lighting systems. In an alternative embodiment, the data may be passed through an external network for processing into information.

In embodiment of the reverse-beacon 108, a smartphone 108 or other mobile device 108 such as that shown in FIG. 4 which includes the necessary transceiver 105 and computer 106 elements may be loaded with special software allowing it to process collected signals from the three or more system nodes 103 within a detection field 109 and determine its 108 location relative to the system nodes 103 as described herein. The smartphone 108 would receive signals and process the signals into usable information, and the information may be displayed to the user through the smartphone's screen. The phone 108 may also interface with Bluetooth™ or Wi-Fi to communicate with other systems inside the household, including but not limited to lighting systems to allow for tracking of the reverse-beacon 108 to act as a control for such additional systems.

In an embodiment of the reverse-beacon 108, a device 108 comprising of a transceiver 105 and a small computer 106 may be attached to an inanimate object in which signals will be received. The on-board computer 106 will process said signal into data. The on-board computer 106 may be used to process data into usable information, or said data may be passed through a wireless network and processed remotely. The device 108 may then interface with Bluetooth to communicate with other systems inside the household, including but not limited to opening doors such as, but not limited, to garage doors, or turning on electrical systems, lights, and/or a heating, ventilation, and/or air conditioning ("HVAC") system.

In an embodiment of the detection field 109, the detection field 109 comprises any quantity of system nodes 103. The system nodes 103 may all utilize the same communication protocol, or they may utilize different communication protocols. A heterogeneous field 109 will be more often the case, as households commonly hold devices of different communication methods, such as a Wi-Fi wireless router and a Bluetooth™ speaker set.

In an embodiment of the detection field 109, multiple detection fields 109 may be set up to track various individual rooms within a household.

In an embodiment of the monitor, a smartphone may be outfitted with an app that acts as a user interface to the system. Processed information may be displayed from the app, and the user may customize settings, view statistical data, and manually interact with the system.

In an embodiment of the monitor, the display may be done aurally or tactilely instead of visually. After data is processed into usable information, the reverse-beacon 108 may send cues to the user when the user has entered a detection field 109. This sort of cue includes but is not limited to vibrating different patterns for the different statuses a user may have or playing different tunes depending on the status of the user, in which tunes would be played upon status change.

In an embodiment of the monitor, a system of monitors may be set up around the house to display information to one or more users. Various monitors may be connected to the wireless network, and each one may display different information depending on its location in the house or whomever views it the most. All monitors could be configured by a smartphone app or some other user interface.

In an embodiment of the algorithm, the detection field 109 would be calibrated upon set up and periodically re-calibrated to maintain accuracy of the system. The algorithm would keep certain variables subject to change in order to adapt to calibrations, such as thresholds or sample sizes. In an alternative embodiment, the algorithm may incorporate machine learning or evolutionary aspects such that it may adjust to changing environments.

In an embodiment of the algorithm, the algorithm exists on the same device 108 as the transceiver 105, as firmware on a computer. It may be duplicated to allow for multiple detection fields 109 to exist within a household. In an alternative embodiment, the algorithm may be detached from the rest of the system and exist on a computer server, such as the cloud. Data could be transmitted via a wireless network to the algorithm, which will process the data and transmit usable information back to the user. The communication method may be done in a variety of ways, including but not limited to Wi-Fi and Bluetooth™.

In an embodiment of the algorithm, the reverse-beacon 108 may be augmented by additional sensing devices 110, including, but not limited to, inertial measurement units 110 such as gyroscopes, global positioning system ("GPS") systems, and range-finders, which may increase the accuracy of the outputs by allowing the reverse-beacon 108 to more effectively handle noise and outliers within the wireless signals. Said device 110 may be attached as an accessory to the reverse-beacon 108, and its data may be parallelized as needed. Its status or outputs may be integrated with the reverse-beacon's outputs in a second layer decision tree to come up with more precise information based on a combination of the data from wireless signals and the data from the sensors 110.

In an embodiment of the network, the existing detection field 109 interfaces with the reverse-beacon 108, which may transmit data or usable information through a wireless network for processing, distribution, or storage.

In an embodiment of the network, data may be visualized on an external system known to the network through an encryption protocol.

In an embodiment of the network, the reverse-beacon 108 may detect new system nodes 103 based on new signal transmissions. Said system nodes 103 may be added to a detection field 109 and incorporated into the algorithm given user input.

As described herein, the reverse-beacon 108 may use existing wireless communication devices to determine whether the reverse-beacon 108 is within the area defined by a set of wirelessly communicating devices. By way of example and not limitation, given an area defined by nodes 103 around the perimeter of said area, a reverse-beacon 108 with knowledge of such area may discern whether it is located within the perimeter of said given area or outside of said given area based upon signal strength trends from each of the nodes 103. This means that the reverse-beacon 108 does not require calibration and can operate using nodes 103 communicating via different protocols.

In one potential exemplary use case for this technology, existing wireless communication devices in a shopping mall environment may be used to determine which store a person may be in. Stores typically have wireless cameras, point of sale devices, and/or wireless routers, and it is possible to use the interior space defined by such nodes 103 to define a detection field 109 for the store. When a customer using a smartphone as a reverse-beacon 108 is travelling in the mall, the smartphone 108 can determine whether it is approaching that store, moving away from that store, within that store, or out of range of that store (e.g., if devices from the store are not visible to the smartphone in question). Such a system uses existing infrastructure to provide beacon-like functionality in a purely software deployment that does not require additional hardware or retrofits/upgrades, which are required for other beacon-based proximity marketing activities. Through a software platform integrated on a reverse-beacon device 108, existing wireless communication infrastructure may be utilized for indoor location capability.

In another exemplary use case, feedback may be provided to advanced occupancy detection systems, where the accuracy of a reverse-beacon-based approach may be higher than that of an advanced occupancy detection system. Said system may again utilize existing wireless communication devices to determine if a person is within or outside of a space, providing feedback to an advanced occupancy system, which could use information gathered during the time when a person is known to be in said space to enhance its functionality in future detections. Because the reverse-beacon 108 can operate with a variety of different wireless communication devices without requiring said devices to be configured for use with the reverse-beacon 108, such a system can be deployed more easily and inexpensively, and to a wider variety of existing systems, than prior art solutions, which require configuration of the devices included in the system.

As described, the reverse-beacon 108 differs from current beacons on the market today, such as Apple™ beacons. Prior art beacons require that the device actively interacts/communicates with the beacon. In the present disclosure, however, the reverse-beacon 108 acts as a passive listener to communication signals occurring independently of the reverse-beacon. The reverse-beacon 108 requires no other interaction with these other nodes 103 to determine its position relative to them, and imposes no significant additional communication load on the system.

It should be noted that the methods described herein are descriptive, and anyone of ordinary skill in the art of basic trigonometric mathematics is capable of deriving a location solution.

It should be noted that RSSI is usually measured by receivers in any communication system. Depending upon the bandwidth of the receiver, the transmission frequency, and the antenna gain, RSSI can be a very exact measure of distance and differential distance from the transmitter. For some systems, such as BLE (Bluetooth™ Low Energy), it may not be a precise measure, and may become less accurate as distance increases. A specific methodology will account for the accuracies of the communication system upon which it is dependent.

The described reverse-beacon system allows for the use of existing wireless nodes in a system where the reverse-beacon may locate itself relative to the interior space created by said devices without requiring any configuration from those devices. This allows for one to set up a reverse-beacon based location system using the reverse-beacon itself and not requiring changes one the nodes the reverse-beacon is using for location. The reverse-beacon can then use its determination of location for a variety of purposes, including indoor GPS, advanced occupancy sensor system feedback, proximity marketing, and more without needing to change the infrastructure already in place at a facility.

It will be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for locating a reverse-beacon comprising;
   providing a reverse beacon comprising a transceiver and a computer in communication with said transceiver;
   providing a plurality of system nodes, said plurality forming a detection field;
   creating a plurality of historical datasets by obtaining measurements between a first system node in said plurality of system nodes and said reverse-beacon with said reverse beacon at different locations within said detection field, wherein said measurements are obtained by:
      placing said reverse-beacon within said detection field;
      receiving at said reverse-beacon, first system node signals from said first system node at said transceiver;
      converting at said computer said first system node signals to a historical dataset including a first system node identifier and a first system node distance between said first system node and said reverse beacon; and
      moving said reverse-beacon relative to said detection field a plurality of times and at each time in said plurality of times repeating said receiving and said converting to form said plurality of said historical datasets;
   at a later time, determining at said computer that said reverse-beacon is within said detection field by comparing each of said historical datasets in said plurality of historical datasets to first system node signals received by said reverse beacon at said later time.

2. The method of claim 1 wherein said reverse-beacon comprises a mobile device.

3. The method of claim 2, wherein said reverse beacon comprises a smart phone or tablet computer.

4. The method of claim 2, wherein said reverse beacon comprises a wearable computer device.

5. The method of claim 1, wherein said first system node is selected from the group consisting of: a computer; a network device; and a smart appliance.

6. The method of claim 1, wherein said determining at said computer further comprises determining a location determination status of said reverse-beacon with respect to said detection field.

7. The method of claim 6, wherein said location determination status is selected from the group consisting of approaching; departing; in room; static; and mobile.

8. The method of claim 1 wherein said computer comprises a local network computer.

9. The method of claim 8, wherein said reverse-beacon includes said local network computer.

10. The method of claim 1, wherein said computer comprises a wireless computer server communicably coupled to said transceiver over a telecommunications network.

11. The method of claim 1, further comprising:
    providing a third party system;
    operating said third party system based at least in part on said location of said reverse-beacon determined in said determining.

12. The method of claim 11, wherein said third party system is selected from the group consisting of; an electrical system; a lighting system; a heating, venting, and cooling (HVAC) system; a security system; a home automation system; an industrial automation system.

13. The method of claim 1, wherein said detection field is formed by wireless communications using a protocol selected from the group consisting of: Bluetooth™, Bluetooth™ Low Energy, ANT, ANT+, WiFi, Zigbee, Thread, and Z-Wave.

14. The method of claim 1, wherein. at least one said system node in said plurality of system nodes is configured to communicate using a different communication protocol than at least one other system node in said plurality of system nodes.

15. The method of claim 1 Wherein said detection field is disposed within an indoor space.

16. The method of claim 1, wherein the method is performed by said reverse-beacon only passively receiving wireless communication signals from said first system node.

17. The method of claim 1, wherein the method is performed by said reverse-beacon actively receiving wireless communication signals from said first system node.

18. A system for locating a reverse-beacon in a detection field comprising:
 a plurality of system nodes, said plurality forming a detection field;
 a reverse-beacon comprising a transceiver, a computer, and a non-volatile computer-readable storage medium having program instructions thereon which, when executed by said computer, cause said reverse-beacon to perform the steps of:
 creating a plurality of historical datasets by obtaining measurements between a first system node in said plurality of system nodes and said reverse-beacon with said reverse beacon at different locations within said detection field, wherein said measurements are obtained by:
  receiving first system node signals from said first system node of said transceiver;
  converting said first system node signals to a historical dataset including a first system node identifier and a first system node distance between said first system node and said reverse beacon;
  repeating said receiving and said converting a plurality of times while said reverse-beacon is moving relative to said detection field to form said plurality of said historical datasets and;
 at a later time, determining that said reverse-beacon is within said detection field by comparing each of said historical datasets in said plurality of historical datasets to first system node signals received by said reverse-beacon at said later time.

19. The system of claim 18, further comprising:
 a third-party system;
 a computer server;
 wherein said program instructions thereon which, when executed by said computer, further cause said reverse-beacon to perform the steps of:
 transmitting said determined location of said reverse-beacon on said computer server;
 wherein said computer server comprises a non-volatile computer-readable medium having program instructions thereon which when executed by said computer server, cause said computer server to operate said third party system based at least in part on said determined location of said reverse-beacon.

20. The system of claim 19, wherein said third party system is selected from the group consisting of; an electrical system; a lighting system; a heating, venting, and cooling (HVAC) system; a security system; a home automation system; an industrial automation system.

* * * * *